United States Patent [19]

Ching-Hwei

[11] Patent Number: 4,787,015
[45] Date of Patent: Nov. 22, 1988

[54] BASE FOR SIGNAL LIGHT

[76] Inventor: Lan Ching-Hwei, No. 65, Shuang-shih Rd., Sec. 2, Panchiao City, Taipei Hsien, Taiwan

[21] Appl. No.: 57,019

[22] Filed: Jun. 1, 1987

[51] Int. Cl.⁴ .............................................. B60Q 1/00
[52] U.S. Cl. ....................................... 362/80; 362/220; 362/250; 362/427; 362/396
[58] Field of Search ................. 362/61, 80, 220, 233, 362/287, 275, 427, 428, 430, 396, 249, 250, 285; 340/49, 84, 87, 97; 248/278, 284

[56] References Cited

U.S. PATENT DOCUMENTS

| | | | |
|---|---|---|---|
| 1,165,944 | 12/1915 | Chalier | 362/220 |
| 2,535,372 | 12/1950 | Schaeffer et al. | 362/250 |
| 3,008,259 | 11/1961 | Zornes | 248/284 |
| 3,075,069 | 1/1963 | Spadaro | 362/250 |
| 3,179,366 | 4/1965 | Lowell | 362/427 |
| 3,485,471 | 12/1969 | McCurdy | 248/284 |
| 4,306,280 | 12/1981 | Burke | 362/432 |
| 4,470,106 | 9/1984 | Norton | 362/287 |
| 4,574,269 | 3/1986 | Miller | 340/87 |
| 4,598,344 | 7/1986 | Nadler | 362/220 |
| 4,627,515 | 6/1987 | Baker | 362/430 |

Primary Examiner—Ira S. Lazarus
Assistant Examiner—D. M. Cox
Attorney, Agent, or Firm—Ostrolenk, Faber, Gerb & Soffen

[57] ABSTRACT

A new fixture base structure for the indication light mainly characterizes that a L-type connection plate is pivoted between the fixing base board and the light tube joint base and has two fixing base boards on its two ends and the light tube joint base which works by an external force, can change the direction to make the indication light adjusted to a more desirable and conspicuous position.

2 Claims, 3 Drawing Sheets

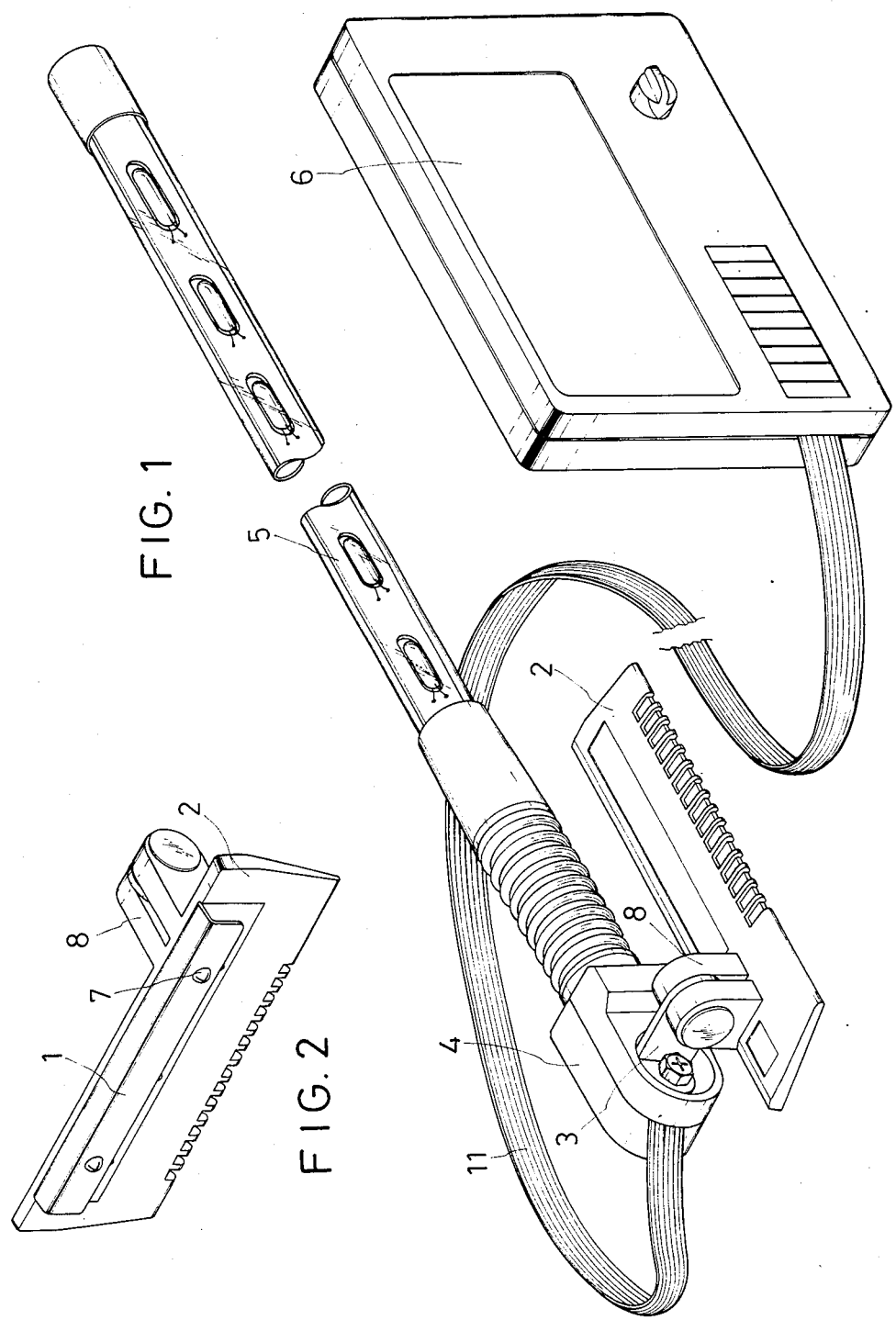

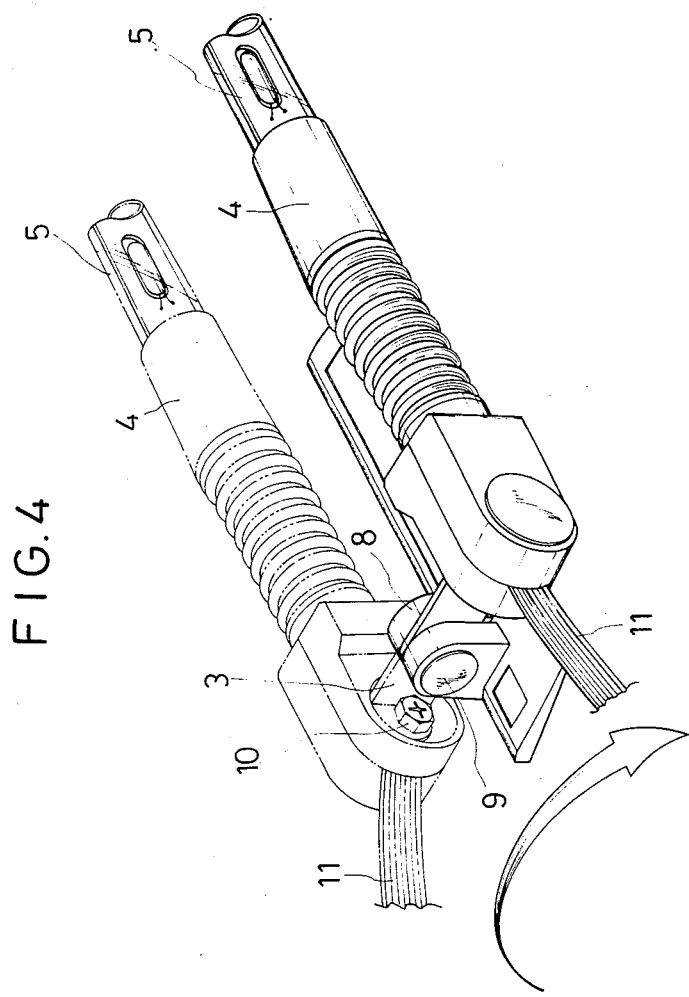

BASE FOR SIGNAL LIGHT

FIELD OF THE INVENTION

The present invention relates to a novel base structure of a signal light and, in particular, to the base structure of the 3rd signal light for an automobile to facilitate the adjustments to selected optimum angles.

BACKGROUND OF THE INVENTION

Since the prevalent use of the 3rd signal light device for automobiles has been very popular, its object is strongly to warn the drivers of oncoming automobiles trailing the user's car, so that these drivers can react in time in order to take proper measures to play safe for both parties. This has the function of giving strong signals to the drivers in the rear. However, the conventional signal lights of various types have a fixture base in a fixed form which once fixed, cannot be adjusted to adapt to the actual needs thereby creating the greatest defect.

OBJECTS OF THE INVENTION

The main object of the present invention is to solve the above-mentioned difficult by providing a new base structure, so when and after the joint buckle is joined to the car body, the direction and position of the light tube can be adjusted at any time to adequately meet the needs of the user.

SUMMARY OF THE INVENTION

An new base structure for the signal light structure is primarily composed of a joint buckle, a base board, a L-type joint plate, a light tube joint base, a light tube and a control box. Its feature lies in that a L-type joint plate is pivoted between the base board and the light tube joint base, the action of said L-type joint plate can adjust the base board and the light joint base to proper angles, thereby making the signal light brighter and more visible.

BRIEF DESCRIPTION OF THE DRAWINGS

FIG. 1 is an external view in perspective of an embodiment of the present invention.

FIG. 2 is a view in perspective of the back side of the base board of the present invention.

FIG. 4 is a view showing the action of the other end of the L-type joint plate of the present invention.

SPECIFIC DESCRIPTION

Figure 3:
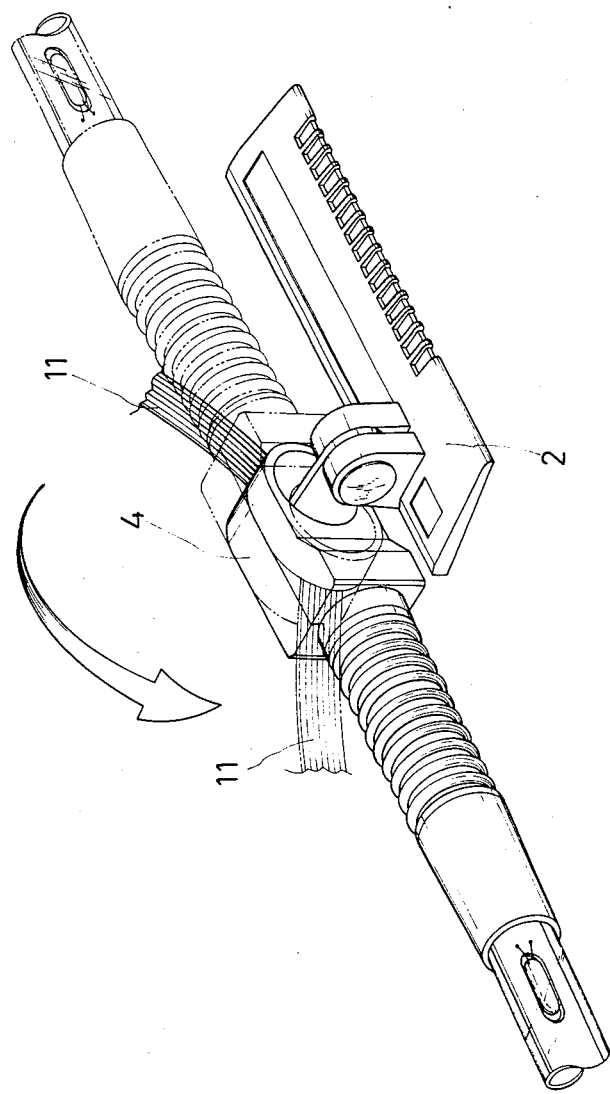
FIG. 3 is a schematic view in perspective showing the action of the L-type joint plate in the present invention.

Referring to the drawings the present invention is composed of a joint buckle (1), a base board (2), a L-type joint plate (3), a light tube joint base (4), a light tube (5) and a control box (6). The light tube (5) and control box (6) are connected to the brake light in parallel, so that during braking, the light can generate continuously moving blinking signal according to a well known common technique that requiring further repetition herein.

In the present invention, said joint buckle (1) is in an inverse U shape (as shown in FIG. 2). One side is connected to the back side of said base board (2) and the other side has several fixing screws (7) to tightly lock said joint buckle (1) on a part of the car body, when said joint buckle (1) is connected to that part of the car body. Said base board (2) is in an elongated bar form. A convex pivoting lug (8) is provided on the front face of said base board (2). The pivotal shaft (9) (see FIG. 4) is pivoted to the pivoting hole on one leg of the L-type joint plate (3) to make said L-type joint plate (3) rotational and adjustable 180° in the range of said base board (2) in an arc around pivot shaft 9 (as shown in FIG. 3). The other end of said L-type joint plate (3) is also provided with a pivoting hole. A screw (10) or any other connector is passed through said pivoting hole to pivot the light tube joint base (4), thereby making said light tube joint base (4) to rotate and adjust its positions within 180° at the end of the respective leg of said L-type joint plate (3) through a plane of swing of the tube inherently suggested (as shown in FIG. 4). One end of said light tube joint base (4) is jointed to said light tube (5), while its other end is connected to the control box (6) by array wires (11).

What I claim is:

1. A base structure for a signal light;
   said signal light being in a tube form and further comprising means for illuminating at least a portion of said tube; said signal light tube having a joint base toward an end of said tube;
   said base structure comprising a base board; said base board having a direction of extension; said base board carrying a pivot lug projecting therefrom and normal to the direction of extension;
   a first pivot shaft pivotally connecting said pivot lug and said joint base for enabling pivoting of said light tube about said first pivot shaft and about said joint base with said light tube swingable through a plane to selected angular positions with respect to said base board;
   a second pivot shaft oriented perpendicular to such first pivot shaft pivotally connecting said pivot lug and said joint base wherein said joint base along with said tube is movable through an arc raising the tube and the joint base to a selected height over the support base and an L-shaped plate, having a first leg of said plate connecting said plate to said pivot lug at said first pivot shaft and having a second leg of said plate connecting said plate to said joint base; the length of said first leg determining the height of said joint base and of said light tube above said base board.

2. The base structure for a signal light of claim 1, further comprising a joint buckle of U-shaped cross-section for securing said base board to a selected support, one side of said joint buckle is connected to said base board to clamp said base board to an object by means of said joint buckle and the other side of a joint buckle of U-shaped cross-section is provided with securement means for securing said other side to a selected support.

* * * * *